(12) United States Patent
Weir

(10) Patent No.: US 8,525,503 B2
(45) Date of Patent: Sep. 3, 2013

(54) HYBRID RECTIFIER

(75) Inventor: Steven P. Weir, Petaluma, CA (US)

(73) Assignee: Xandex, Inc., Petaluma, CA (US)

( * ) Notice: Subject to any disclaimer, the term of this patent is extended or adjusted under 35 U.S.C. 154(b) by 274 days.

(21) Appl. No.: 13/098,703

(22) Filed: May 2, 2011

(65) Prior Publication Data

US 2011/0273155 A1     Nov. 10, 2011

Related U.S. Application Data

(60) Provisional application No. 61/332,617, filed on May 7, 2010.

(51) Int. Cl.
*G05F 1/00* (2006.01)

(52) U.S. Cl.
USPC ......................................... 323/283

(58) Field of Classification Search
USPC .......... 323/224, 283–285, 286, 287; 363/89, 363/126, 127, 76, 78–81, 84
See application file for complete search history.

(56) References Cited

U.S. PATENT DOCUMENTS

| | | | |
|---|---|---|---|
| 5,099,302 A | 3/1992 | Pavlin | |
| 5,225,712 A | 7/1993 | Erdman | |
| 5,521,467 A | 5/1996 | Statnic et al. | |
| 5,523,940 A | 6/1996 | Wymelenberg | |
| 5,789,902 A | 8/1998 | Abe et al. | |
| 5,847,912 A | 12/1998 | Smith et al. | |
| 5,912,552 A * | 6/1999 | Tateishi | 323/285 |
| 5,940,287 A * | 8/1999 | Brkovic | 363/127 |
| 6,038,152 A | 3/2000 | Baker | |
| 6,212,084 B1 | 4/2001 | Turner | |
| 6,421,262 B1 | 7/2002 | Saxelby et al. | |
| 7,015,561 B2 | 3/2006 | Saxelby et al. | |
| 7,199,636 B2 * | 4/2007 | Oswald et al. | 327/325 |
| 7,408,796 B2 | 8/2008 | Soldano | |

FOREIGN PATENT DOCUMENTS

| | | |
|---|---|---|
| JP | 2000-092824 | 3/2000 |
| JP | 2004-056982 | 2/2004 |

OTHER PUBLICATIONS

International Search Report and Written Opinion dated Jan. 2, 2012, PCT Application No. PCT/US2011/034822.

* cited by examiner

*Primary Examiner* — Timothy J Dole
*Assistant Examiner* — Afework Demisse
(74) *Attorney, Agent, or Firm* — Weaver Austin Villeneuve & Sampson LLP

(57) ABSTRACT

A hybrid voltage rectifier enables a switch mode DC-DC power converter to safely power an external dynamic load by way of a substantially lossless conductive coupling between an output filter of the converter and the load. The rectifier is controlled so as to permit net average current through an inductor of the output filter to be approximately equal to, but not less than, zero by permitting very low loss conduction in the first quadrant and, selectively, cycle by cycle, in the third quadrant during load operation. The converter has a first switch, an output filter, a second switch, and a controller. The output filter is conductively coupled with the first switch, and has an inductor in series with the load. The controller sets state conditions of the second switch, such that the inductor operates in a continuous current mode.

21 Claims, 12 Drawing Sheets

HYBRID RECTIFIER

RELATED APPLICATION DATA

The present application claims the priority of U.S. Provisional Patent Application No. 61/332,617 entitled Hybrid Rectifier, filed May 7, 2010, the entire disclosure of which is incorporated herein by reference for all purposes.

FIELD OF THE INVENTION

The present invention relates to a voltage rectifier, particularly to a hybrid voltage rectifier configured to enable a switch mode DC-DC converter to safely power a dynamic load, while permitting: (i) an output filter inductor to operate in continuous current mode with net average current approaching zero; and, (ii) a substantially lossless conductive coupling between the output filter inductor and the load.

BACKGROUND OF THE INVENTION

A voltage rectifier acts as a switch that has a low resistance to current flow in a first voltage/current quadrant, and a very high resistance to current flow in the three remaining voltage/current quadrants. Referring to FIG. 1a, characteristics of an ideal voltage rectifier are illustrated. An ideal voltage rectifier acts as a switch that imposes zero resistance to current flow in the first voltage/current quadrant, and imposes infinite resistance to current flow in quadrants two through four. As illustrated in FIG. 1b, a practically achievable passive semiconductor diode exhibits less than ideal characteristics.

An active circuit employing a feedback amplifier and power switching device such as a MOSFET transistor may be used instead of a passive diode so as to realize a transfer function that is a much closer approximation of an ideal diode in quadrant one. As a result, referring now to FIG. 1c, such an active rectifier provides a forward voltage difference, and associated power loss at a given current, that is much smaller than is achievable with a passive rectifier, while still blocking current flow in quadrants two through four up to the breakdown voltage of the devices used.

FIG. 2 illustrates a circuit model of an ideal active rectifier 200. According to the circuit model, infinite voltage gain feedback amplifier 203, responsive to a voltage difference between first rectifier terminal 201 and second rectifier terminal 202, generates control signal 204, that operates ideal switch 205. Any positive voltage difference between first rectifier terminal 201 and second rectifier terminal 202 results in control signal 204 operating switch 205 to a closed position. As a result, current flows between rectifier terminals 202 and 201 with zero resistance. A negative voltage difference between first rectifier terminal 201 and second rectifier terminal 202 results in control signal 204 operating switch 205 to an open position, thereby blocking all current flow between rectifier terminals 202 and 201.

Contrary to the ideal circuit model illustrated in FIG. 2, in practice, real components have non-zero, forward voltage conduction resistance, as well as finite reverse polarity leakage and breakdown voltage.

Referring now to FIG. 3, a voltage rectifier 303 is illustrated as being incorporated into a "buck" topology DC-DC power converter 300 having DC voltage source 301, MOSFET switch 302, voltage rectifier 303, and an output filter consisting of inductor 305 and capacitor 307. Inductor 305 is normally operated in continuous conduction mode (CCM). Whether voltage rectifier 303 is a passive diode (as shown), or an active rectifier, non-zero minimum load current requirements are imposed.

When switch 302 is ON, voltage source 301 drives $V_{IN}$ to node 304. Current builds up in inductor 305 at a rate determined by the voltage difference between node 304, and node 306, divided by the inductance of inductor 305.

When switch 302 turns OFF, inductor current, $I_L$ recirculates through the loop formed by voltage rectifier 303, load 308, in parallel with capacitor 307, and inductor, 305. Current in inductor 305 decreases at a rate determined by the voltage difference between nodes 304 and 306, divided by the inductance of inductor 305. The voltage difference between nodes 304 and 306 equals to $V_{OUT}$ plus the forward voltage drop of voltage rectifier 303. If voltage rectifier 303 is an active rectifier, rather than the passive diode, as illustrated, the forward voltage drop will be substantially lower and the power efficiency of power converter 300 will be improved.

Whether voltage rectifier 303 is passive, with a transfer function illustrated in FIG. 1b, or active, with a transfer function illustrated in FIG. 1c, voltage rectifier 303 permits inductor current in only a single direction: from node 304 to node 306. When current through load 308 is less than the average inductor current, capacitor 307 charges towards $V_{IN}$, and the output voltage $V_{OUT}$ rises above the time average of the voltage at node 104.

The minimum current required to sustain CCM operation, can be reduced by increasing the inductance of inductor 305. However, increasing the inductance increases the energy storage at any given current level, with the result that the size and cost of the inductor is likewise increased. Increasing the ratio of maximum to minimum current in the inductor also increases the winding resistance, reducing inductor efficiency. Moreover, increasing the inductance increases the characteristic impedance of the output filter, and decreases the output filter bandwidth. Each of these effects increases the size and cost of capacitor 307.

Referring now to FIG. 4, passive voltage rectifier 303 is replaced by a switch 403 operable to perform the current recirculation function of voltage rectifier 303, while also permitting operation in the third quadrant ("reverse current"). For the illustrated circuit, average inductor current can be driven close to zero because inductor current $I_L$ reverses for part of each cycle. As a result, supporting a zero average load current condition at node 406 is possible. Referring still to FIG. 4, active switch 403A operates in complementary and mutually exclusive fashion to switch 402. Whereas passive diode 403B only conducts in quadrant one, switch 403A can operate in both quadrants one and three.

A disadvantage of the circuit illustrated in FIG. 4, however, is that switch 403 requires similar overcurrent protection as primary switch 402. It is important in any DC-DC converter applications to protect against excessive current that may damage or destroy circuits. The current in any inductor is the time integral of the voltage applied across it. In a typical buck topology DC-DC converter, the main concern is volt-second product unbalance due to a shorted load. Under these conditions, the volt-second product developed when switch 402 is OFF is very small, and fails to balance the volt-second product developed when switch 402 is ON. Current then rapidly builds in inductor 305. Thus, for the circuit illustrated in FIG. 4, the average on-time of switch, 402, under fault conditions, must be limited to small values.

Referring now to FIG. 5, a known practice is to employ cycle-by-cycle and/or "hiccup" mode current limiting to mitigate the above mentioned problem. A current sensor 509, develops a signal, 510, that is proportional to switch current.

A comparator, 513, resets latch 514 when the sensed value exceed threshold voltage 512. Threshold voltage 512 may be selected as varying between zero and a maximum safe value according to an error voltage of a control loop (not shown). Latch 514 turns switch 402 OFF until triggered at the start of the next cycle by synchronization pulse stream 511.

In "hiccup" mode, when a fault level current is detected, switch 402 is switched OFF for a period of time equal to many normal switching cycles so as to limit power dissipation in all components to safe values by limiting average voltage across capacitor 307 and current buildup in inductor 305.

Referring now to FIG. 6, a further known technique is illustrated for protective circuitry useful when the connected load is a dynamic load, for example, when the connected load contains a large energy store such as a capacitor, or is a kinetic load. Here, current sensor 617 is operable to trigger turn-OFF of MOSFET 403A under appropriate circumstances. In addition to latch 514, coupled with switch 402 as described above, a separate latch, 621 is operable to control MOSFET 403A. An OR gate 620 resets latch 621, responsive to the same synchronization pulse stream 511 stream that sets latch 514. Comparator 513 resets latch 514, turning switch 402 OFF. Comparator 513 simultaneously sets latch 621, turning switch 403A on. Typically, additional circuitry (not shown) ensures dead-time between the two switches so as to prevent cross-conduction. Whenever current sense signal, 618, exceeds voltage threshold 622, comparator 619, via OR gate 620, resets latch 621, turning MOSFET 403A OFF. Inductor current diverts through diode 623, back to the input source. Inductor current decays at a rate determined by the difference between $V_{OUT}$ and $V_{IN}$ and the inductance of inductor 305.

Known alternative techniques function similarly, but may utilize a single current sense element that monitors current flow between node 604 and inductor 305. When current flowing from node 604 to inductor 305 reaches a first limited threshold, then the high-side switch, 402, latches OFF. When the current flowing from inductor 305 to node 604, reaches a second limited threshold, the low side switch, 403A, latches OFF.

For the foregoing techniques, employing a synchronous rectifier with overcurrent protection, FIG. 7 depicts the current versus voltage transfer function. A disadvantage of such techniques is that the current sensors 509 and 617, and additional diode 623, represent undesirable additional cost, space, and power consumption.

Referring now to FIG. 8, in a particular application of a DC-DC converter, voltage source 801 is a photovoltaic (PV) substring or module. One or more DC-DC converters within a series string of PV modules connect to an input of an external load, which may be, for example, a shared central power converter, such as a DC to AC inverter 830. Typically, a DC to AC inverter, particularly a one or two-phase output inverter, incorporates a large energy storage capacitor 831, at the input. Capacitor 831 buffers the continuous power delivery from a PV string or array source, from the pulsating power output of the single or two-phase power output inverter. In the absence of diode 825, DC-DC converter third quadrant (reverse) current at 824 would permit discharge of large energy storage capacitor 831. Such discharge can occur rapidly, interfering with operation of inverter 830 and potentially damaging components throughout the attached string. As a result of diode 825, operation of switch 403A in quadrant three can only discharge capacitor 307, and not large energy storage capacitor 831. Thus, diode 825 prevents damaging discharge of capacitor 831. A disadvantage of the above-described technique is that diode 825 is a significant cause of power loss, as well as a contributing undesirably to system cost and size.

SUMMARY OF THE INVENTION

The present inventor has recognized that a hybrid voltage rectifier may be configured so as to enable a switch mode DC-DC power converter to safely power an external dynamic load by way of a substantially lossless conductive coupling between an output filter of the converter and the load. Advantageously, the hybrid voltage rectifier may be controlled so as to permit net average current through an inductor of the output filter to be approximately equal to, but not less than, zero by permitting very low loss conduction in the first quadrant and, selectively, cycle by cycle, in the third quadrant during load operation.

In an embodiment, the switch mode DC-DC power converter includes a first switch, an output filter, and a hybrid rectifier. The output filter is conductively coupled with the first switch, and has an inductor in series with an external load. The hybrid rectifier has a controller and a second switch, the controller being configured to set state conditions of the second switch such that the inductor operates in a continuous current mode and a net average current through the inductor is approximately equal to, and not less than, zero. The DC-DC power converter may be configured to deliver power to the external load by way of a substantially lossless conductive coupling between the output filter and the load.

In a further embodiment, the controller may have a logic circuit that sets a first state and a second state of the second switch. The second switch, in the first state, permits substantially lossless current flow through the second switch in both a forward and a reverse direction, and, in the second state, permits forward current flow while blocking substantially all reverse current flow through the second switch. The controller may be configured to set the first state when the first switch is open and a voltage difference across the second switch exceeds a first threshold value and set the second state when either (i) the first switch is closed; or (ii) the voltage difference across the second switch is less than a second threshold value.

In another embodiment, the second switch may include an active electronic switch in parallel with a passive rectifier configured to block reverse current flow. In an embodiment, the active electronic switch may include a MOSFET. In a further embodiment, the passive rectifier may include a Schottky diode.

In an embodiment, an apparatus includes: a controller that sets a state of an active electronic switch, the switch having a first terminal and a second terminal, the controller having a first input and a second input, the first input configured to carry a timing input signal, and the second input configured to carry a second input signal. The second input signal may include a signal indicative of a voltage difference between the first terminal and the second terminal. The controller may be configured to: set the active electronic switch to an ON state when the timing input signal is in an enable condition and the second input indicates the voltage difference between the first terminal and the second terminal exceeds a first threshold quantity; and set the active electronic switch to an OFF state, when either: (i) the timing input signal is in a disable condition; or (ii) the second input indicates the voltage difference between the first terminal and the second terminal is less than a second threshold value.

In an embodiment, the controller is an element of a switch mode DC-DC power converter. The power converter may include a first switch; an output filter conductively coupled with the first switch, and including an inductor in series with an external load, and a capacitor in parallel with the external load; and a second switch including the active electronic switch and having a first output conductively coupled with a terminal of the inductor and a second output conductively coupled with a terminal of the capacitor.

In a further embodiment, the inductor may be operable in continuous current mode.

In another embodiment, a net average current through the inductor may be approximately equal to, and not less than, zero.

In an embodiment, the switch mode DC-DC power converter may deliver power to the external load by way of a substantially lossless conductive coupling between the output filter and the external load.

In an embodiment, a switch mode DC-DC power converter includes a first switch; an output filter conductively coupled with the first switch, and including an inductor in series with an external load, and a capacitor in parallel with the external load; a second switch having a first terminal conductively coupled with the inductor and a second terminal conductively coupled with the capacitor; a controller for the second switch, the controller including a logic circuit that sets a first state and a second state of the second switch, the second switch, in the first state, permitting substantially lossless current flow through the second switch in both a forward and a reverse direction, and, in the second state, blocking substantially all reverse current flow through the second switch. The controller may be configured to set the first state when the first switch is open and a voltage difference across the second switch exceeds a first threshold value; and set the second state when either (i) the first switch is closed; or (ii) the voltage difference across the second switch is less than a second threshold value.

In a further embodiment, the inductor is operable in continuous current mode.

In another embodiment, a net average current through the inductor is approximately equal to, and greater than, zero.

In a still further embodiment, the switch mode DC-DC power converter is configured to deliver power to the external load by way of a substantially lossless conductive coupling between the output filter and the load.

In an embodiment, a photovoltaic system includes a plurality of PV substrings, and at least one switch mode DC-DC converter, disposed between at least one of the plurality of PV substrings and an external load. The DC-DC converter includes a first switch, an output filter, a second switch, and a controller; the output filter being conductively coupled with the first switch, and including an inductor in series with the external load; the controller being configured to set state conditions of the second switch such that the inductor operates in a continuous current mode and a net average current through the inductor is approximately equal to, and not less than, zero; and the DC-DC power converter being configured to deliver power to the external load by way of a substantially lossless conductive coupling between the output filter and the load.

A further understanding of the nature and advantages of the present invention may be realized by reference to the remaining portions of the specification and the drawings.

DETAILED DESCRIPTION

Reference will now be made in detail to specific embodiments of the invention including the best modes contemplated by the inventor for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Figure 9:
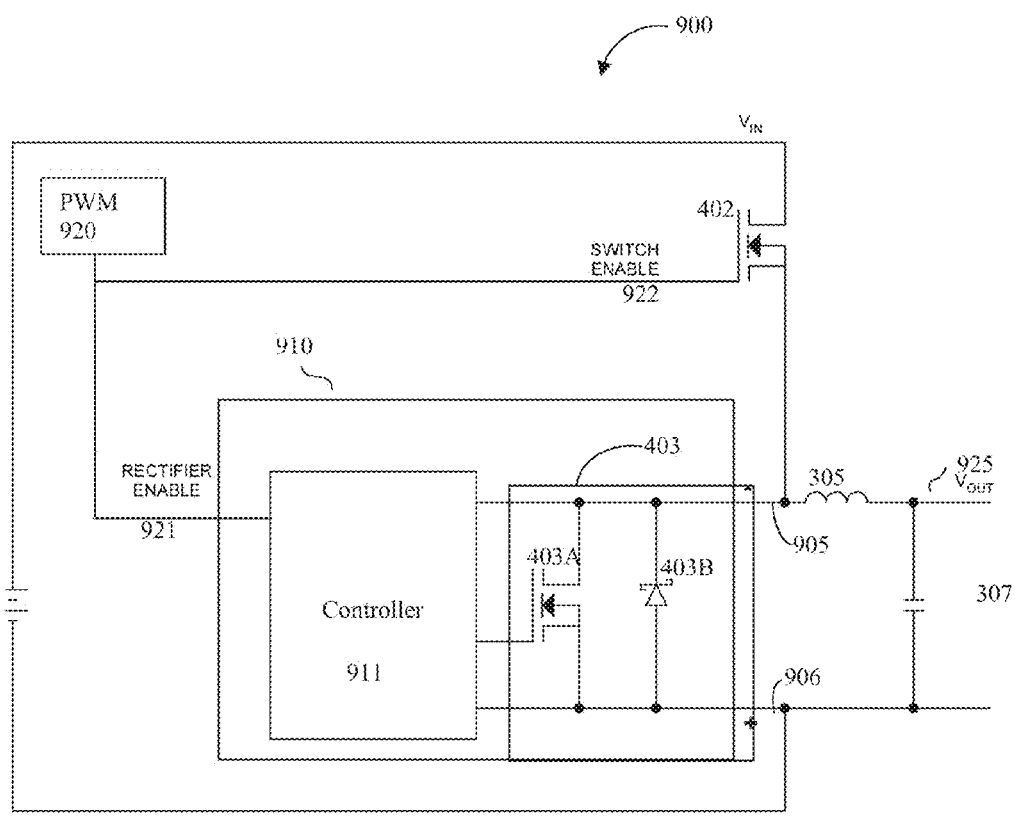
FIG. 9 illustrates a buck DC-DC Converter according to an embodiment.

In an embodiment, referring now to FIG. 9, switch mode DC-DC power converter 900 has a first switch 402, an output filter (consisting, in the illustrated example, of inductor 305 and capacitor 307), and hybrid rectifier 910 (consisting, in the illustrated example, of controller 911 and second switch 403). In an embodiment, controller 911 may be configured to set state conditions of second switch 403 such that inductor 305 will operate in a continuous current mode and experience a net average current approximately equal to, but not less than, zero. Advantageously, DC-DC power converter 900 may be configured to deliver power to an external load (not shown) by way of a substantially lossless conductive coupling between the output filter and the load. For example, the external load may be connected directly in parallel with capacitor 307.

Advantageously, hybrid rectifier 910 may combine the voltage-driven operation of an active rectifier with the state-driven operation of a synchronous rectifier. For example, referring still to FIG. 9, where hybrid rectifier 910 includes second switch 403 (consisting, in the illustrated example, of MOSFET 403A in parallel with Schottky diode 403B) and controller 911, controller 911 may have a logic circuit that sets a first state and a second state of second switch 403. For example, the control circuit may set the first state of second switch 403 by setting MOSFET 403A to a closed position when first switch 402 is open and a voltage across second switch 403 exceeds a first threshold value. When second switch 403 is configured in the first state, substantially lossless current flow may be permitted through MOSFET 403A of second switch 403 in both a forward and a reverse direction.

Further, the control circuit may set the second state of second switch 403 by setting MOSFET 403A to an open position when either (i) first switch 402 is closed, or (ii) a voltage across second switch 403 is less than a second threshold value. When configured in the second state, second switch 403 permits current flow (through diode 403B) only in the forward direction, while blocking substantially all reverse current flow.

Advantageously, with appropriate selection of the first and second threshold values, hybrid rectifier 910 operates so as to permit very low loss conduction in the quadrant one, and, selectively, cycle by cycle, in quadrant three during load operation. Because potentially damaging reverse currents from the load are effectively blocked by switch 403, DC-DC power converter 900 is enabled to safely power a dynamic external load by way of a substantially lossless conductive coupling between the output filter of converter 900 and the load.

In an embodiment, a pulse width modulator (PWM) 920 may provide an input to enable and disable both first switch 402 and hybrid rectifier 910 in a mutually exclusive manner. For example, when a signal from PWM 920 is high, a switch ENABLE input 922 condition may be set TRUE at first switch 402, and first switch 402 may be turned ON, whereas a rectifier ENABLE input 921 condition may be set FALSE. Contrariwise, when the signal from PWM 920 is low, the switch ENABLE input 922 condition may be set FALSE and first switch 402 may be turned OFF, whereas the rectifier ENABLE input 921 condition signal may be set TRUE.

Whether or not PWM 920 is employed, because controller 911 is configured to only turn MOSFET 403A ON in quadrant one, the rectifier ENABLE signal, 921, may assert TRUE before switch 402 has turned OFF, without risk of cross-conduction.

Although, as illustrated in FIG. 9, switch 403 may consist of a MOSFET 403A and a Schottky diode 403B, it is to be understood that other types of active electronic switches may be substituted for MOSFET 403A. Moreover, other types of passive rectifier may be substituted for Schottky diode 403B.

Figure 10:
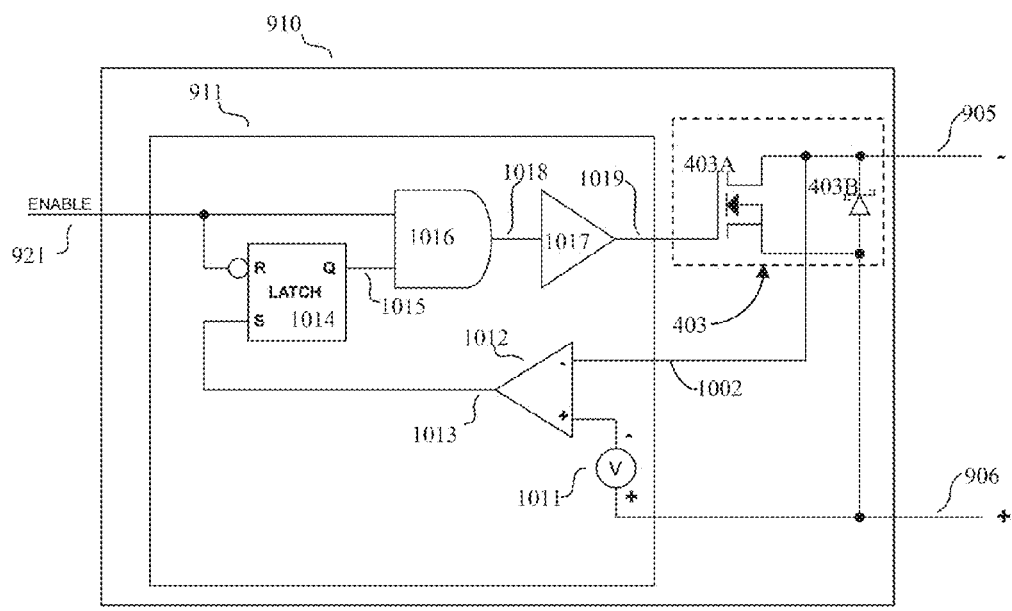
FIG. 10 illustrates a hybrid rectifier according to an embodiment.

Referring now to FIG. 10, an example of controller 911 suitable for use in some embodiments, is illustrated in more detail. In the illustrated embodiment, controller 911 includes voltage comparator 1012, offset voltage source 1011, latch 1014, AND gate 1016 and switch driver 1017. Output 1018 of AND gate 1016 signifies TRUE only when both of output signal 1015 of latch 1014 and enable signal 921 signify TRUE. Otherwise, output 1018 signifies FALSE, thereby causing output 1019 of switch driver 1017 to turn MOSFET 403A OFF.

Referring still to FIG. 10, upon a change of state of rectifier ENABLE input 921 from FALSE to TRUE, output signal 1015 remains FALSE, until and unless signal 1013 from comparator 1012, also signifies TRUE. For example, if, while ENABLE signal 921 signifies TRUE, the voltage on negative node 905 is more negative with respect to node 906 than threshold voltage 1011, comparator 1012 may output latch set signal 1013. Latch set signal 1013 may cause latch 1014 to SET, with the result latch 1014 output signal 1015 signifies TRUE. As a result, output 1018 of AND gate 1016 signifies TRUE and switch driver 1017 may turn MOSFET 403A ON.

In an embodiment, the magnitude of threshold voltage 1011 is, under all normal operating conditions, a value somewhat greater than the offset error voltage of comparator 1012. Advantageously, threshold voltage 1011 may be greater than the minimum voltage drop of diode 403B, plus the maximum offset voltage of comparator 1012 at the lowest current that MOSFET 403A should support.

Advantageously, an embodiment combines the voltage-driven operation of an active rectifier with the state-driven operation of a synchronous rectifier. For example, on a cycle-by-cycle basis, an embodiment of hybrid rectifier 910 may operate as an active rectifier, in that active switch 403A will not be turned on outside of quadrant one. However, once the active switch 403A has been turned on, hybrid rectifier 910 behaves as a synchronous switch and can operate in both quadrant one and quadrant three for the remainder of the cycle. As a result, reverse current from inductor 305 is permitted only during cycles where inductor current is first positive, enabling net average current to be made approximately equal to zero, while preventing net average current that is less than zero.

Figure 11:
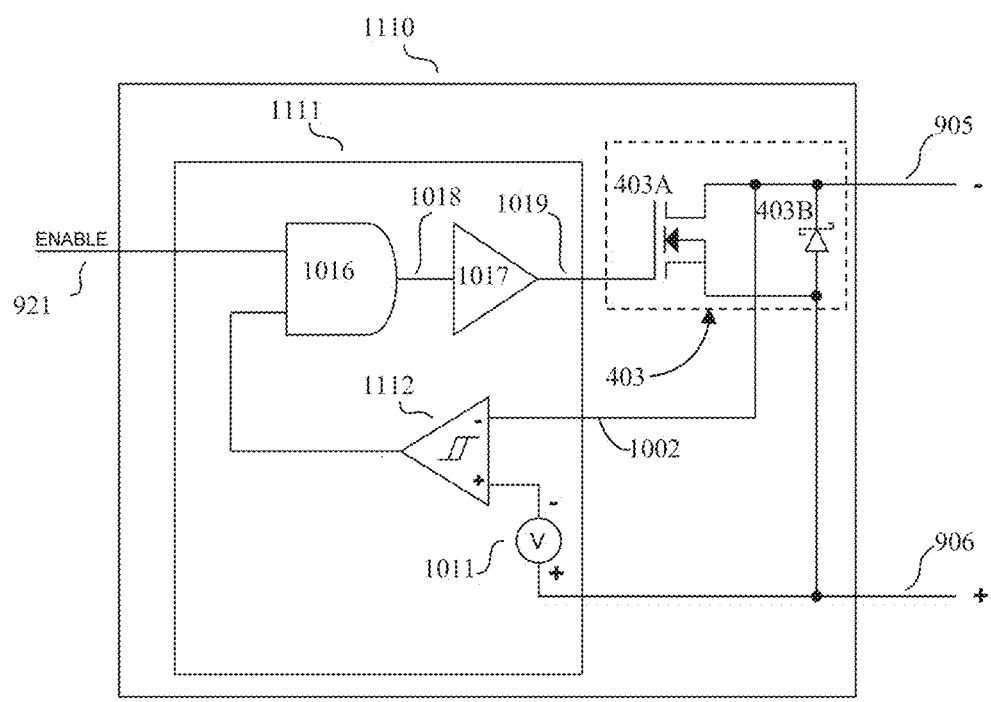
FIG. 11 illustrates a hybrid rectifier according to another embodiment.

Referring now to FIG. 11, a further embodiment is illustrated, wherein controller 1111 of hybrid rectifier 1110 uses comparator hysteresis to perform the functions of latch 1014. For example, an off-to-on threshold of comparator, 1112, remains unchanged at a value between zero and the forward voltage drop of diode, 403B, at low current. The on-to-off threshold is set to a value that exceeds the voltage drop from node 905 to node 906 when switch 403A carries the maximum allowable quadrant three current. In a typical application, the maximum allowable quadrant three current is approximately one-half a current swing through inductor 305 at a 50% duty cycle:

$$I_{MAXIMUM\_THIRD\_QUADRANT} = V_{IN\_MAXIMUM} * T_{PERIOD}/(8*L_{OUT})$$

Advantageously, the hybrid rectifier provides a recirculation current path for filter inductor 305 in a switch mode power supply such as, for example, the buck topology converter illustrated in FIG. 9. Each cycle, when primary switch 402 is ON, node 905 is driven to $V_{IN}$, thereby increasing current in inductor 305 and from node 905 to node 925 At the time when the switch ENABLE input 922 condition is set FALSE, thereby turning switch 402 OFF, positive current may continue to flow through Schottky diode 403B. When rectifier ENABLE input 921 is set true, controller 911 detects the voltage at node 905 sufficiently negative with respect to node 906 to latch MOSFET 403A ON. Positive convention current (as opposed to electron current flow) now flows through MOSFET 403A from node 906 to node 905. When output voltage 925 is positive with respect to node 906, and for a sufficiently long MOSFET 403A on-time, current through inductor 305 diminishes to zero and finally reverses direction, flowing from node 905 through MOSFET 403A to node 906.

Advantageously, the peak and average third-quadrant current values through inductor 305 may be governed without explicit current sensors and associated signal processing. Instead, values of $V_{IN}$, $V_{OUT}$, the inductance of inductor 305, switch 323 on-time, and enable on-time of hybrid rectifier 910 determine current parameters for inductor 305.

Figure 1:
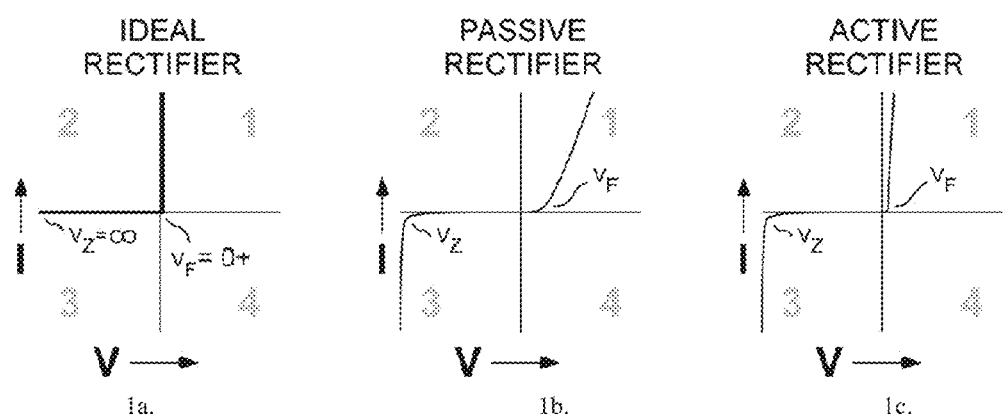
FIG. 1 illustrates transfer functions fro ideal, passive and active rectifiers.
Figure 2:
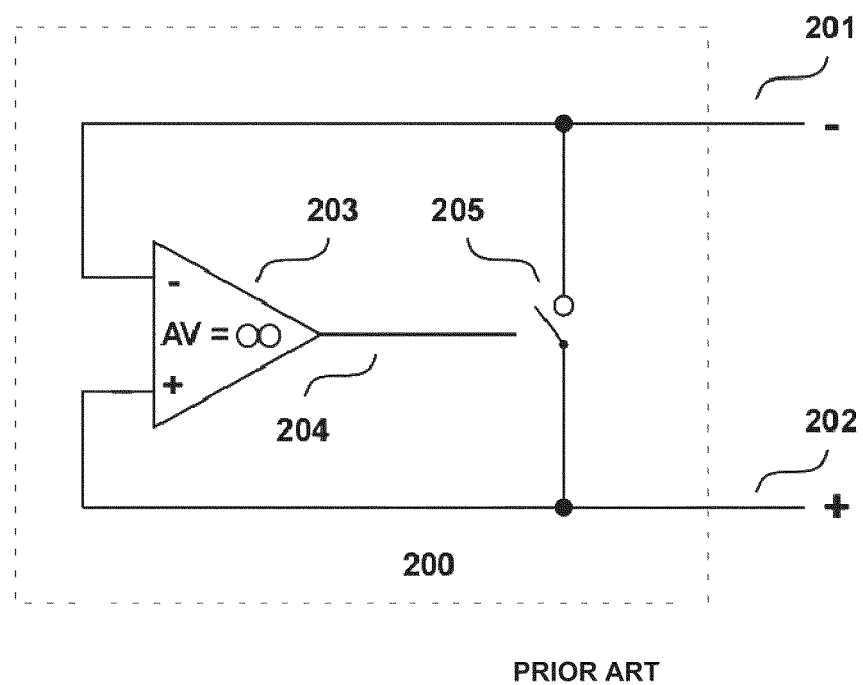
FIG. 2 illustrates a model of an ideal active rectifier.
Figure 3:
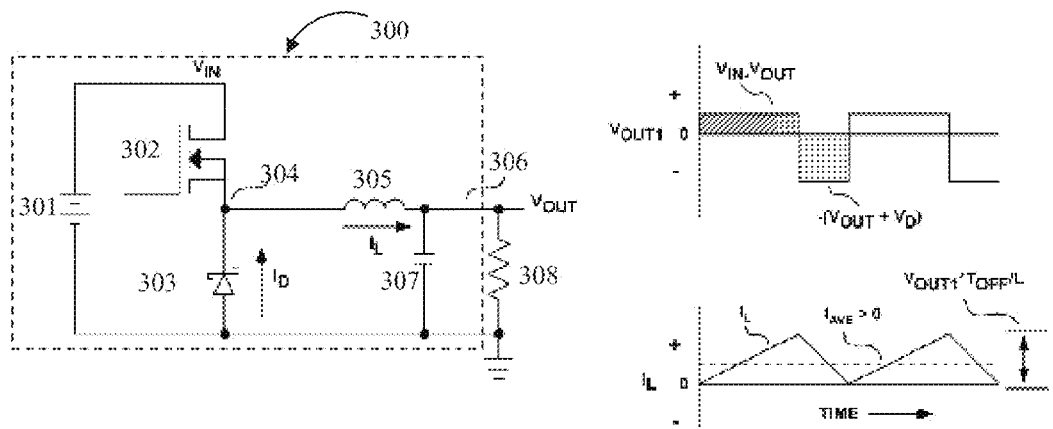
FIG. 3 illustrates PV a buck converter using a conventional voltage rectifier.
Figure 4:
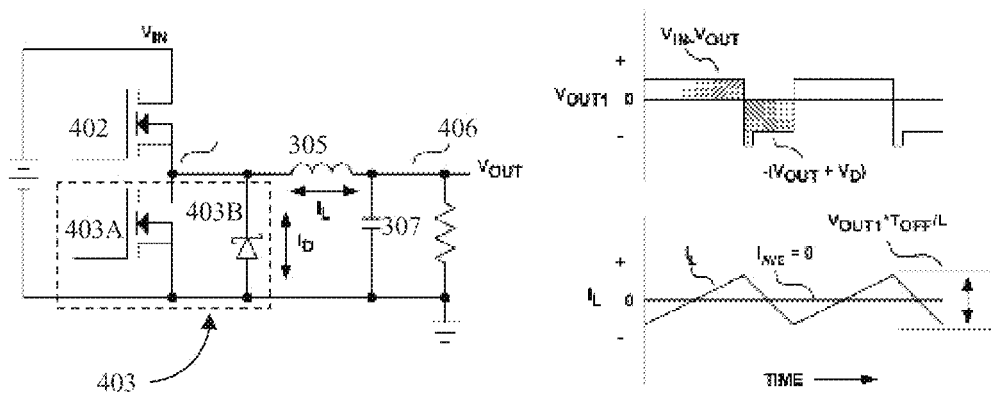
FIG. 4 illustrates a buck converter using a synchronous voltage rectifier
Figure 5:
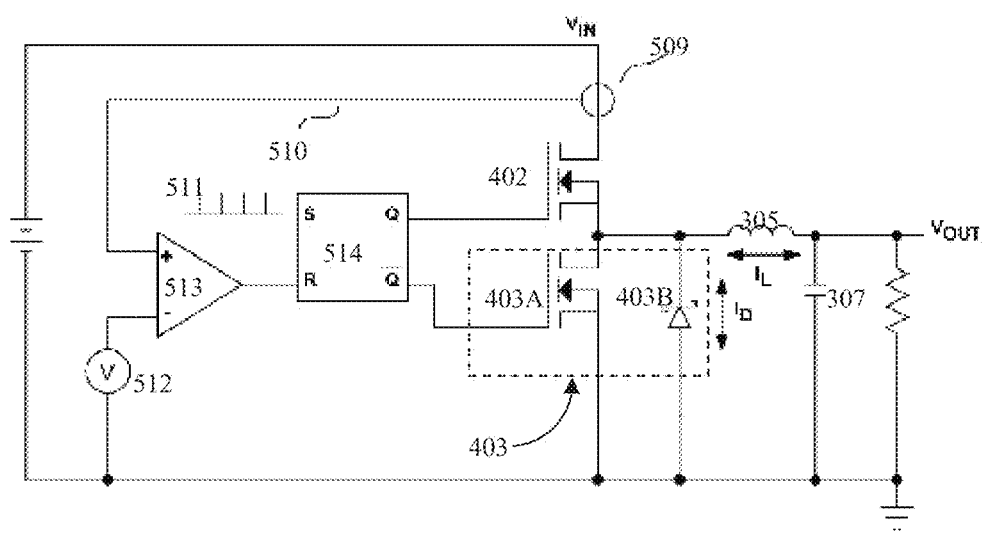
FIG. 5 illustrates a buck converter with cycle-by-cycle current limit.
Figure 6:
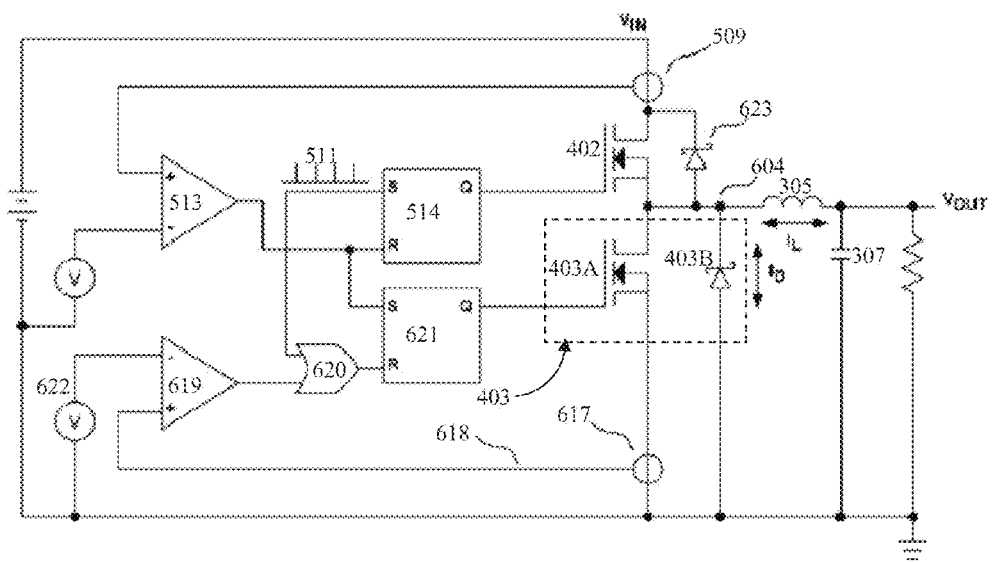
FIG. 6 illustrates a buck converter with cycle by cycle current limit both switches.
Figure 7:
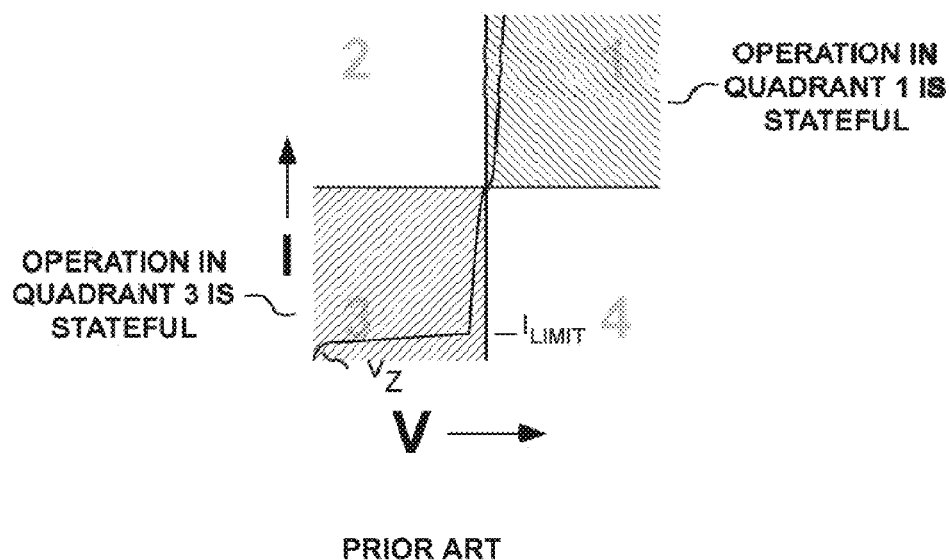
FIG. 7 illustrates I/V transfer function, synchronous rectifier with current limit.
Figure 8:
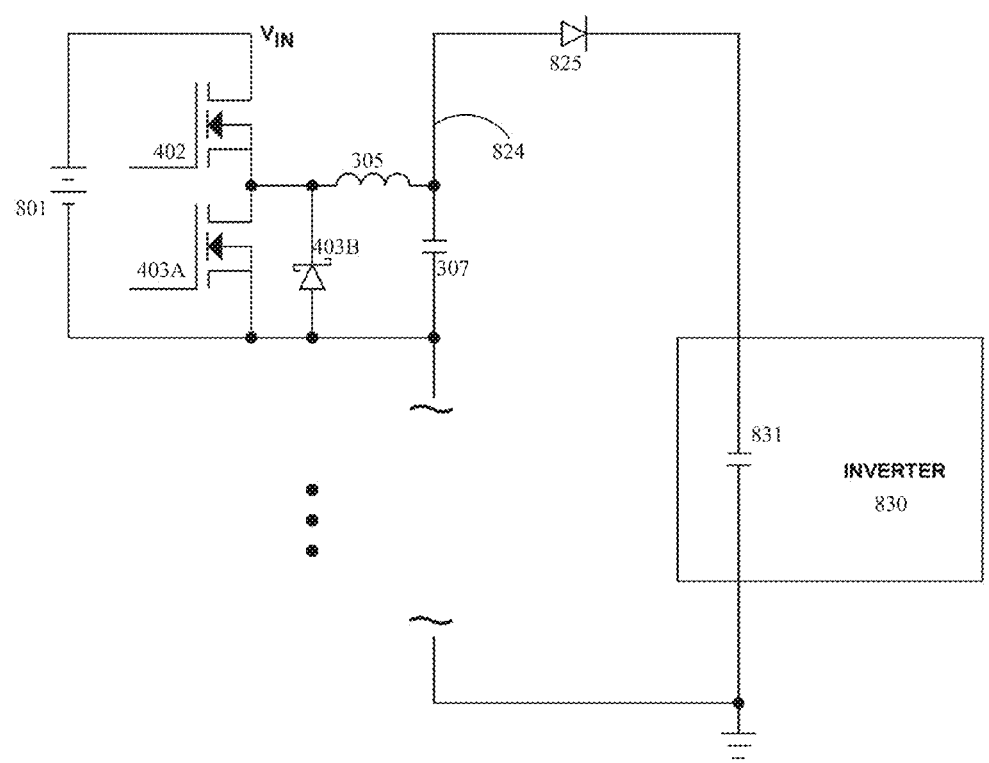
FIG. 8 illustrates a PV string with a DC-DC converter, external load with inverter and energy discharge capacitor, and inverter reverse current blocking diode.
Figure 12:
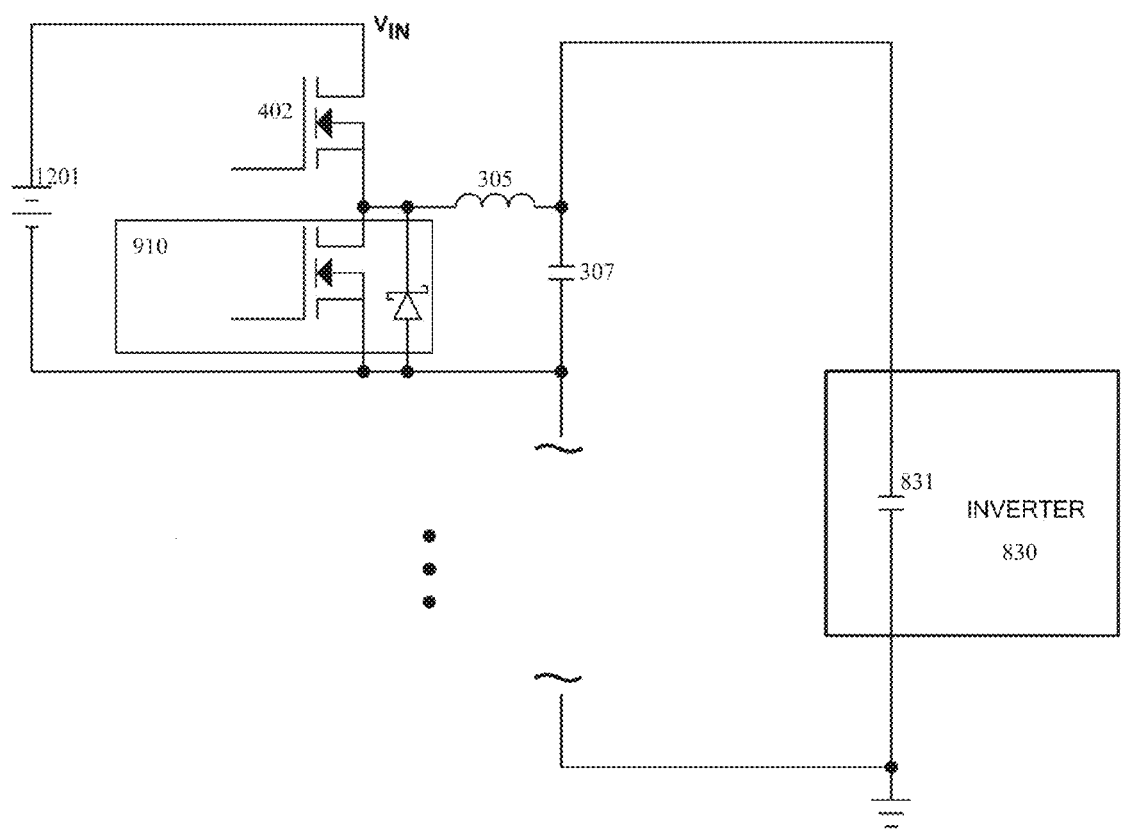
FIG. 12 illustrates a PV string with DC-DC a converter according to an embodiment.

Referring now to FIG. 12, in an embodiment, voltage source 1201 may be a photovoltaic (PV) substring or module. As described above, with reference to FIG. 8, one or more DC-DC converters within a series string of PV modules may connect to an input of DC to AC inverter 830. Inverter 830 may include an input capacitor 831. Capacitor 831 buffers the continuous power delivery from a PV string or array source, from the pulsating power output of the single or two-phase power output inverter. Because quadrant-three current may be limited to safe values by choice of controller 910 design parameters, as described above, the need for a string level rectifier, e.g., FIG. 8, 825, is obviated.

Thus a hybrid rectifier has been disclosed that enables a switch mode DC-DC converter to safely power a dynamic load, while permitting an output filter inductor to operate in continuous current mode with net average current approaching zero and permitting a substantially lossless conductive coupling between the output filter inductor and the load. While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A switch mode DC-DC power converter, comprising:
a first switch, an output filter, and a hybrid rectifier;
the output filter being conductively coupled with the first switch, and comprising an inductor in series with an external load;
the hybrid rectifier comprising a controller and a second switch, the controller being configured to:
(i) set state conditions of the second switch such that the inductor operates in a continuous current mode; and
(ii) on a cycle by cycle basis, selectively allow reverse current to flow through the inductor such that a net average current through the inductor is approximately equal to, and not less than, zero; and
the DC-DC power converter being configured to deliver power to the external load by way of a substantially lossless conductive coupling between the output filter and the load.

2. The switch mode DC-DC power converter of claim 1, wherein the controller comprises:
a logic circuit that sets a first state and a second state of the second switch, the second switch, in the first state, permitting substantially lossless current flow through the second switch in both a forward and a reverse direction, and, in the second state, permitting forward current flow while blocking substantially all reverse current flow through the second switch, wherein,
the controller is configured to:
set the first state when the first switch is open and a voltage difference across the second switch exceeds a first threshold value; and
set the second state when either (i) the first switch is closed; or (ii) the voltage difference across the second switch is less than a second threshold value.

3. The switch mode DC-DC power converter of claim 1, wherein the second switch comprises an active electronic switch in parallel with a passive rectifier configured to block reverse current flow.

4. The switch mode DC-DC power converter of claim 3, wherein the active electronic switch comprises a MOSFET.

5. The switch mode DC-DC power converter of claim 3, wherein the passive rectifier comprises a Schottky diode.

6. An apparatus comprising:
a controller that sets a state of an active electronic switch, the switch having a first terminal and a second terminal;
the controller being configured to:
receive a first input carrying a timing input signal, and a second input signal, the second input signal being indicative of a voltage difference between the first terminal and the second terminal;
set the active electronic switch to an ON state when the timing input signal is in an enable condition and the second input signal indicates the voltage difference between the first terminal and the second terminal exceeds a first threshold quantity; and
set the active electronic switch to an OFF state, when either: (i) the timing input signal is in a disable condition; or (ii) the second input signal indicates the voltage difference between the first terminal and the second terminal is less than a second threshold value.

7. The apparatus of claim 6, wherein the controller is an element of a switch mode DC-DC power converter, the power converter comprising:
a first switch;
an output filter conductively coupled with the first switch, and comprising an inductor in series with an external load, and a capacitor in parallel with the external load; and
a second switch comprising the active electronic switch and having a first output conductively coupled with a terminal of the inductor and a second output conductively coupled with a terminal of the capacitor.

8. The apparatus of claim 7 wherein the inductor is operable in continuous current mode.

9. The apparatus of claim 7 wherein a net average current through the inductor is approximately equal to, and not less than, zero.

10. The apparatus of claim 7, wherein the switch mode DC-DC power converter delivers power to the external load by way of a substantially lossless conductive coupling between the output filter and the external load.

11. The apparatus of claim 7, wherein the active electronic switch is in parallel with a passive rectifier configured to block reverse current flow.

12. The apparatus of claim 11, wherein the active electronic switch comprises a MOSFET.

13. The apparatus of claim 11, wherein the passive rectifier comprises a Schottky diode.

14. A switch mode DC-DC power converter, comprising:
a first switch;
an output filter conductively coupled with the first switch, and comprising an inductor in series with an external load, and a capacitor in parallel with the external load;
a second switch having a first terminal conductively coupled with the inductor and a second terminal conductively coupled with the capacitor;
a controller for the second switch, the controller comprising:
a logic circuit that sets a first state and a second state of the second switch, the second switch, in the first state, permitting substantially lossless current flow through the second switch in both a forward and a reverse direction, and, in the second state, blocking substantially all reverse current flow through the second switch, wherein,
the controller is configured to:
set the first state when the first switch is open and a voltage difference across the second switch exceeds a first threshold value; and
set the second state when either (i) the first switch is closed; or (ii) the voltage difference across the second switch is less than a second threshold value.

15. The switch mode DC-DC power converter of claim 14 wherein the inductor is operable in continuous current mode.

16. The switch mode DC-DC power converter of claim 15 wherein a net average current through the inductor is approximately equal to, and not less than, zero.

17. The switch mode DC-DC power converter of claim 14, wherein the switch mode DC-DC power converter is configured to deliver power to the external load by way of a substantially lossless conductive coupling between the output filter and the load.

18. The switch mode DC-DC power converter of claim 14, wherein the second switch comprises an active electronic switch in parallel with a passive rectifier configured to block reverse current flow.

19. The switch mode DC-DC power converter of claim 18, wherein the active electronic switch comprises a MOSFET.

20. The switch mode DC-DC power converter of claim 18, wherein the passive rectifier comprises a Schottky diode.

21. A photovoltaic system, comprising a plurality of PV substrings, and at least one switch mode DC-DC converter, disposed between at least one of the plurality of PV substrings and an external load, the DC-DC converter comprising:
- a first switch, an output filter, a second switch, and a controller;
- the output filter being conductively coupled with the first switch, and comprising an inductor in series with the external load;
- the controller being configured to:
    (i) a set state conditions of the second switch such that the inductor operates in a continuous current mode; and
    (ii) on a cycle by cycle basis, selectively allow reverse current to flow through the inductor such that a net average current through the inductor is approximately equal to, and not less than, zero; and
- the DC-DC power converter being configured to deliver power to the external load by way of a substantially lossless conductive coupling between the output filter and the load.

* * * * *